United States Patent Office 2,766,286
Patented Oct. 9, 1956

2,766,286

PROCESS FOR THE RESOLUTION OF RACEMIC THREO-1-PHENYL-2-AMINO-1,3-PROPANEDIOL

Vitangelo D'Amato and Renzo Pagani, Milan, Italy, assignors to Lepetit S. p. A., Milan, Italy No Drawing. Application July 13, 1954,
Serial No. 443,148

Claims priority, application Great Britain July 15, 1953

3 Claims. (Cl. 260—570.6)

The present invention relates to a process for the resolution of racemic threo-1-phenyl-2-amino-1,3-propanediol into its optically active antipodes.

It is well known that the compound with which the present invention is concerned is an important intermediate in the synthesis of substances having antibiotic properties as, for example, chloramphenicol, d-(−)-threo-1-p-nitrophenyl-2-dichloroacetamido-1,3-propanediol. It is also well known that only one of the optically active isomers of this compound has useful therapeutic properties. Hence the importance of resolving into its optical antipodes the above intermediate, which can be then triacylated, nitrated, and fully hydrolized, thus yielding d-(−)-threo-1-p-nitrophenyl-2-amino-1,3-propanediol, i. e. the last intermediate of chloramphenicol synthesis. It is to be observed that the resolution into the optically active antipodes is usually carried out at the level of this last intermediate; but it is clear that when the resolution is effected at an earlier stage of the synthesis, an economical advantage is obtained, inasmuch as the cost of the intermediates grows with the progress of the synthetic process.

The resolution of threo-1-p-nitrophenyl-2-amino-1,3-propanediol presents no technical difficulties and has been carried out by salification with an optically active acid, such as d-tartaric, d-mandelic, d-camphosulforic acid in an appropriate solvent. The salt of one of the two optically active forms precipitates first and is recovered by filtration before the other salt crystallizes. From these salts the optically active bases are usually regenerated by treatment with an alkali.

However, no commercially useful examples of resolution of threo-1-phenyl-2-amino-1,3-propanediol are recorded in the chemical literature. Attempts to resolve threo-1-phenyl-2-amino-1,3-propanediol by salification with the above-named optically active acids have been unsuccessful, and no crystalline salts were recovered from the reaction mixtures.

We have surprisingly found that a very simple and quick resolution of the optical antipodes of threo-1-phenyl-2-amino-1,3-propanediol can be effected by treating the racemic aminodiol with an equivalent amount of d-glutamic acid in a lower aliphatic alcohol. The most interesting feature of the reaction with d-glutamic acid is that only one of the optical antipodes, i. e. the dextrorotatory isomer, forms a salt with it, while the laevorotatory antipode does not salify at all and is recovered as such from the mother liquor. The reaction takes place very rapidly, even at room temperature, with a complete separation, it being, however, preferred to stir the mixture for about 5 to 60 minutes. Another surprising feature of our process is that, notwithstanding the peculiarity of the formation of one salt, an equivalent of d-glutamic acid must be added in order to obtain a high yield; the addition of only one-half of that quantity gives poor results, and from the alcoholic mother liquor only about one half of the theoretical amount of the laevorotatory antipode is recovered.

From the salt of d-glutamic acid with the dextrorotatory isomer, the latter can be regenerated by treating the salt with an alkaline solution, collecting the separated d-threo-1-phenyl-2-amino-1,3-propanediol and recrystallizing it from an appropriate solvent.

The present invention is illustrated by the following example:

Example 33.4 g. of racemic threo-1-phenyl-2-amino-1,3-propanediol are dissolved in 600 ml. of 95% ethyl alcohol, and to this solution 29.4 g. of d-glutamic acid are added. The mixture is mechanically stirred for 10 minutes, then it is filtered through a vacuum filter, and the material on the filter is washed with ethyl alcohol. The clear alcohol filtrate is evaporated to dryness in vacuo giving a pasty residue which crystallizes on standing and cooling to below room temperature, or more rapidly by scratching with a small amount of ethyl ether. In any case the residue is suspended in ethyl ether and collected on a vacuum filter. The resulting white crystals are recrystallized from 100 ml. of anhydrous chloroform.

Yield 15.5 g. (93% of the theoretical amount).
The product has a melting point of 115–117°; $[\alpha]_D^{20} -16.9°$ (c. 1.5, H$_2$O).

From the insoluble material which has been collected on the filter, the dextrorotatory isomer is regenerated by treating said material with a concentrated aqueous potassium carbonate solution, collecting on a vacuum filter and recrystallizing the obtained crystals from chloroform. The dextrorotatory threo-1-phenyl-2-amino-1,3-propanediol has the same melting point as the laevorotatory isomer and has $[\alpha]_D^{20} +16.9°$ (c. 1.5, H$_2$O).

What we claim is:

1. A process for the resolution of racemic threo-1-phenyl-2-amino-1,3-propanediol into its optically active isomers, which comprises dissolving racemic threo-1-phenyl-2-amino-1,3-propanediol in a lower aliphatic alcohol, adding to the solution approximately one equivalent of d-glutamic acid, and separating the solution containing the free laevo-threo-1-phenyl-2-amino-1,3-propanediol from the precipitate.

2. Process according to claim 1, wherein the mixing occurs at room temperature and with stirring.

3. A process for preparing laevorotatory threo-1-phenyl-2-amino-1,3-propanediol, which comprises dissolving racemic threo-1-phenyl-2-amino-1,3-propanediol in ethyl alcohol, adding to the solution one equivalent of d-glutamic acid, separating the insoluble material, evaporating the filtered ethyl alcohol solution to dryness in vacuo, and recrystallizing the obtained residue from chloroform.

References Cited in the file of this patent

UNITED STATES PATENTS

| | | |
|---|---|---|
| 2,483,884 | Crooks et al. | Oct. 4, 1949 |
| 2,538,763 | Crooks et al. | Jan. 23, 1951 |
| 2,556,907 | Emmick | June 12, 1951 |

FOREIGN PATENTS

| | | |
|---|---|---|
| 505,852 | Belgium | Sept. 29, 1951 |
| 707,903 | Great Britain | Apr. 28, 1954 |

OTHER REFERENCES

Weijlard et al.: "J. Am. Chem. Soc.," vol. 73 (1951), pp. 1216–18.
Karrer: "Org. Chem." (2nd Ed.), 1946, pp. 96–99.